US011655032B2

(12) United States Patent
Stoner et al.

(10) Patent No.: US 11,655,032 B2
(45) Date of Patent: May 23, 2023

(54) SYSTEMS AND METHODS FOR EFFICIENT BOARDING OF PASSENGER VEHICLES

(71) Applicant: B/E AEROSPACE, INC., Winston Salem, NC (US)

(72) Inventors: Rebecca Stoner, North Granby, CT (US); Eric Johannessen, Holbrook, NY (US)

(73) Assignee: B/E Aerospace, Inc., Winston Salem, NC (US)

( * ) Notice: Subject to any disclaimer, the term of this patent is extended or adjusted under 35 U.S.C. 154(b) by 292 days.

(21) Appl. No.: 16/823,667

(22) Filed: Mar. 19, 2020

(65) Prior Publication Data

US 2021/0291983 A1     Sep. 23, 2021

(51) Int. Cl.
*B64D 11/00*     (2006.01)
*B60Q 3/44*     (2017.01)
*B64D 45/00*     (2006.01)

(52) U.S. Cl.
CPC ............. *B64D 11/00* (2013.01); *B60Q 3/44* (2017.02); *B64D 45/00* (2013.01); *B64D 2011/0053* (2013.01); *B64D 2045/007* (2013.01)

(58) Field of Classification Search
CPC .................. B64D 11/00; B64D 45/00; B64D 2011/0053; B64D 2045/007; B60Q 3/44; G06Q 10/02; G06Q 50/30
See application file for complete search history.

(56) References Cited

U.S. PATENT DOCUMENTS

| 7,204,622 | B2 | 4/2007 | Dowling et al. |
| 10,112,716 | B2 | 10/2018 | Gagnon et al. |
| 10,272,834 | B2 | 4/2019 | Riedel |
| 10,318,893 | B2 | 6/2019 | Dueser et al. |
| 10,482,752 | B2 * | 11/2019 | Griffiths ................. B61D 41/00 |

(Continued)

FOREIGN PATENT DOCUMENTS

| CA | 2881140 A1 * | 8/2015 | ......... B64D 11/0015 |
| CA | 2935382 A1 * | 3/2017 | ............. B64D 11/00 |

(Continued)

OTHER PUBLICATIONS

European Patent Office, European Search Report dated Jul. 21, 2021 in Application No. 21163799.6.

*Primary Examiner* — Valentina Xavier
(74) *Attorney, Agent, or Firm* — Snell & Wilmer L.L.P.

(57) ABSTRACT

A system for boarding a plurality of passengers onto a passenger vehicle having a plurality of unassigned seats is disclosed. In various embodiments, the system includes a first passenger seat and a first occupancy indicator, the first occupancy indicator associated with the first passenger seat; a second passenger seat and a second occupancy indicator, the second occupancy indicator associated with the second passenger seat; and a processor connected to a communication link and to the first occupancy indicator and to the second occupancy indicator, the processor being configured to receive reservation data from a computing device having a seating reservation application engine installed thereon, the computing device configured for connection to the communication link and the seating reservation application engine configured to activate the first occupancy indicator or the second occupancy indicator.

20 Claims, 4 Drawing Sheets

(56) References Cited

U.S. PATENT DOCUMENTS

| | | | | |
|---|---|---|---|---|
| 10,994,633 B2* | 5/2021 | O'Sullivan | ............. | G06F 9/543 |
| 2016/0090192 A1* | 3/2016 | Dunn | ................. | F21V 33/0056 |
| | | | | 362/86 |
| 2018/0327096 A1 | 11/2018 | Lins | | |

FOREIGN PATENT DOCUMENTS

| | | | | | |
|---|---|---|---|---|---|
| GB | 2507740 A | * | 5/2014 | ............. | B60N 2/002 |
| GB | 2563016 | | 12/2018 | | |
| WO | 2015090328 | | 6/2015 | | |
| WO | 2018030987 | | 2/2018 | | |

* cited by examiner

SYSTEMS AND METHODS FOR EFFICIENT BOARDING OF PASSENGER VEHICLES

FIELD

The present disclosure relates generally to methods, apparatus and systems used for efficient boarding of passenger vehicles and, more particularly, to methods, apparatus and systems used to reserve seating prior to or during an aircraft boarding process using an unassigned seating model.

BACKGROUND

The process of boarding an aircraft, train, bus or similar passenger vehicle is often slow and tedious. A major contributor to the slow pace of boarding is the limited number of entrances, often at one end of the vehicle, that the passengers are funneled through. Airlines that offer assigned seats under an assigned seating model employ various techniques to mitigate the slow pace of boarding. These techniques include, for example, boarding passengers seated in a rear portion of the cabin first, boarding passengers seated in a center portion of the cabin next, followed by boarding passengers seated in a front portion of the cabin last, the front portion of the cabin being where the boarding door or entrance is located. Airlines that offer unassigned seats under an unassigned seating model typically benefit from faster boarding times relative to the assigned seating model counterparts. With an unassigned seating model, groups of passengers are permitted to board the aircraft at the same time, with each passenger being required to locate an unoccupied seat once in the cabin. Drawbacks with the unassigned seating model do exist, however, and may include situations where passengers are forced to walk back and forth along an aisle or aisles of the cabin in search of an unoccupied seat or a more desirable seat (e.g., an aisle or window seat or a seat providing easier access to a restroom) or where groups of passengers (e.g., friends or business associates) or family members traveling together are unable to be seated next to one another. These drawbacks may be exacerbated, moreover, particularly when boarding during a latter stage of the boarding process. Airlines have attempted to mitigate some of the delays and congestion of the boarding process under either model, for example, by calling out available seat numbers or encouraging passengers to queue and load in accordance with certain constraints. However, substantial delays and confusion during the boarding process remain. Systems and methods that combine the benefits of both assigned and unassigned seating models into a hybrid model may result in faster boarding times and less downtime for the passenger vehicle being boarded.

SUMMARY

A system for boarding a plurality of passengers onto a passenger vehicle having a plurality of unassigned seats is disclosed. In various embodiments, the system includes a first passenger seat and a first occupancy indicator, the first occupancy indicator associated with the first passenger seat; a second passenger seat and a second occupancy indicator, the second occupancy indicator associated with the second passenger seat; and a processor connected to a communication link and to the first occupancy indicator and to the second occupancy indicator, the processor being configured to receive reservation data from a computing device having a seating reservation application engine installed thereon, the computing device configured for connection to the communication link and the seating reservation application engine configured to activate the first occupancy indicator or the second occupancy indicator via the processor.

In various embodiments, the communication link comprises a local area network. In various embodiments, the communication link comprises a wide area network or an internet. In various embodiments, at least one of the first occupancy indicator and the second occupancy indicator is stored within a passenger service unit. In various embodiments, at least one of the first occupancy indicator and the second occupancy indicator is a reading light. In various embodiments, the computing device is a smartphone.

In various embodiments, the first occupancy indicator is configured to illuminate a first color when the first passenger seat is not occupied or not reserved. In various embodiments, the first occupancy indicator is configured to illuminate a second color when the first passenger seat is occupied or reserved. In various embodiments, the first color is green and the second color is red.

In various embodiments, the passenger vehicle is an aircraft and the processor is configured to receive the reservation data from the computing device during a boarding process. In various embodiments, the seating reservation application engine is configured to activate both the first occupancy indicator and the second occupancy indicator based on instructions received from one of the plurality of passengers.

A method of boarding an aircraft cabin having a plurality of unassigned passenger seats is disclosed. In various embodiments, the method includes the steps of setting a plurality of occupancy indicators within the aircraft cabin to indicate an unoccupied status among the plurality of unassigned passenger seats; and activating via a processor one or more of the plurality of occupancy indicators to indicate a reserved status based on reservation data received from one or more of a plurality of ticketed passengers via a communication link.

In various embodiments, the method further includes the step of receiving via the processor and over the communication link the reservation data from a computing device having a seating reservation application engine installed thereon. In various embodiments, the computing device is configured for connection to the communication link. In various embodiments, the seating reservation application engine is configured to activate a first occupancy indicator associated with a first passenger seat or a second occupancy indicator associated with a second passenger seat. In various embodiments, the communication link comprises a local area network, a wide area network or an internet.

In various embodiments, at least one of the first occupancy indicator and the second occupancy indicator is a light stored within a passenger service unit. In various embodiments, the first occupancy indicator is configured to illuminate a first color when the first passenger seat is not occupied or not reserved. In various embodiments, the first occupancy indicator is configured to illuminate a second color when the first passenger seat is occupied or reserved. In various embodiments, the seating reservation application engine is configured to activate both the first occupancy indicator and the second occupancy indicator based on instructions received from one of the plurality of ticketed passengers.

The forgoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
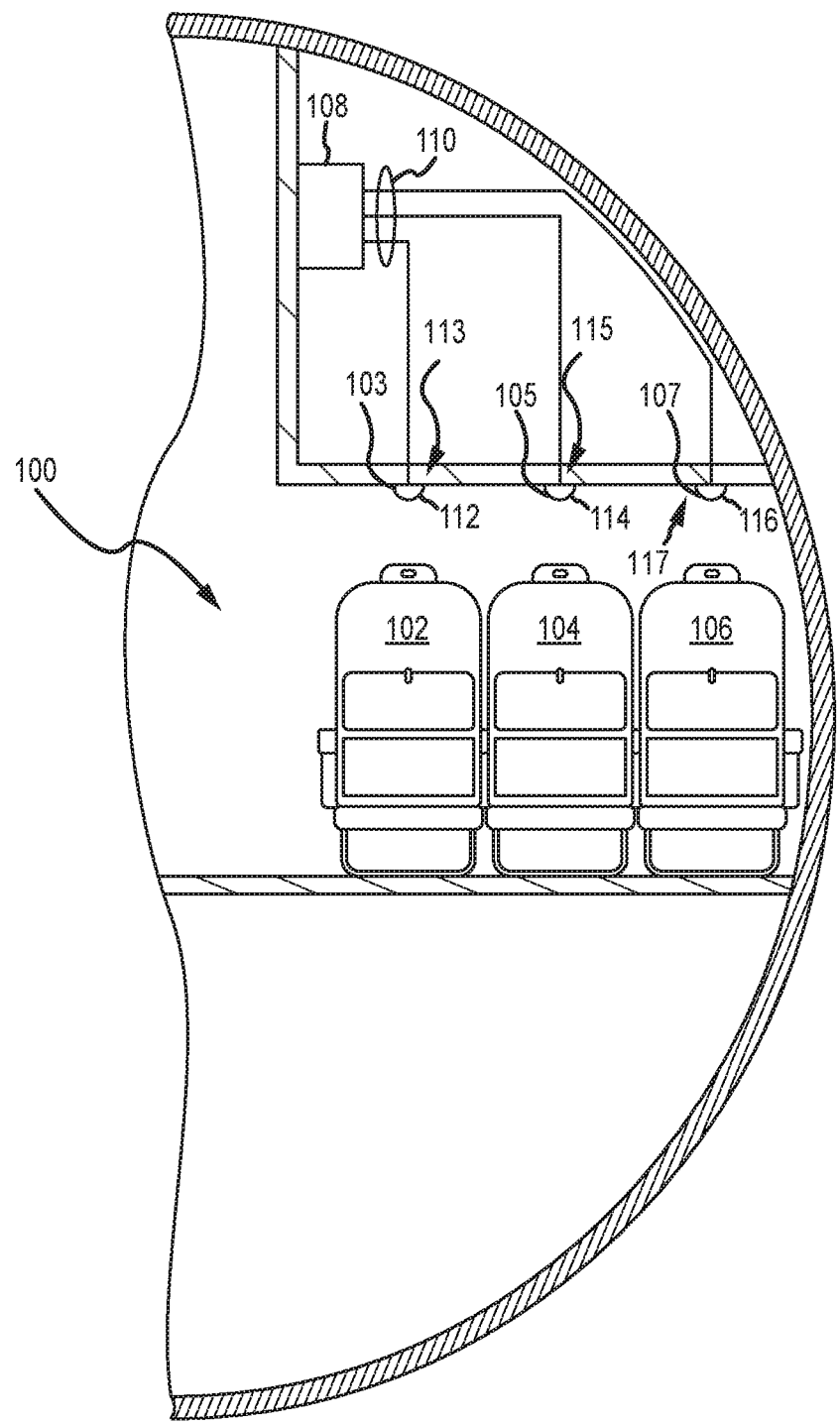
FIG. 1 illustrates a passenger seating section within an aircraft cabin having a status light disposed in relation to each of a plurality of seats, in accordance with various embodiments.

Referring now to the drawings, FIG. 1 illustrates a passenger seating section 100 within an aircraft cabin. The passenger seating section 100 includes a plurality of seats, such as, for example, a first passenger seat 102, a second passenger seat 104 and a third passenger seat 106. Associated with each of the first passenger seat 102, the second passenger seat 104 and the third passenger seat 106 is an occupancy indicator, such as, respectively, a first occupancy indicator 103, a second occupancy indicator 105 and a third occupancy indicator 107. In various embodiments, each occupancy indicator may be disposed overhead a corresponding seat and be attached to or disposed proximate a corresponding passenger service unit—e.g., a first passenger service unit 113, a second passenger seating unit 115 and a third passenger seating unit 117—which typically includes a reading light, an air conditioning port and a flight attendant call button. Each occupancy indicator may, in various embodiments, be electrically connected to a processor 108 via a bus network 110.

Each occupancy indicator typically includes a light, such as, for example, a first light 112 that corresponds to the first passenger seat 102, a second light 114 that corresponds to the second passenger seat 104 and a third light 116 that corresponds to the third passenger seat 106. The light corresponding to each seat indicates to an observer (e.g., a passenger looking for an unoccupied seat) whether or not a particular seat is occupied or otherwise reserved for occupancy. In various embodiments, this operation is accomplished by selection of suitable light colors for each occupancy indicator. For example, the status of an occupied or a reserved seat may be indicated by a red light while the status of an unoccupied or a non-reserved seat may be indicated by a green light. Positioning the occupancy indicator (e.g., the light) downward of each passenger service unit enables a passenger in search of an unoccupied or a non-reserved seat (or a plurality of such unoccupied or non-reserved seats) to scan the entire cabin without having to walk to the seat or seats to observe the occupancy status.

Figure 2:
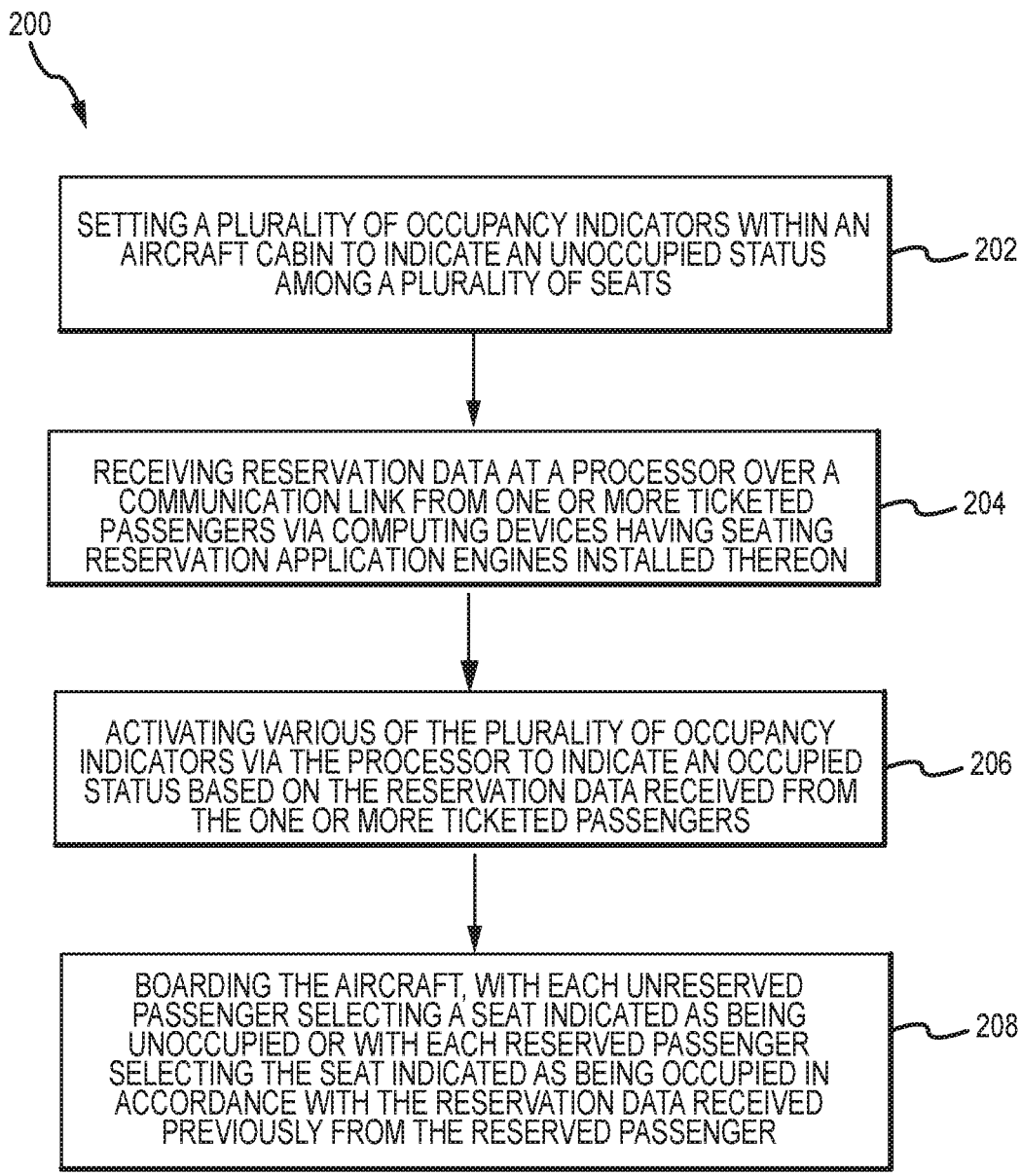
FIG. 2 describes various steps employed in a method for boarding an aircraft using a hybrid seating model.

Referring now to FIG. 2, a method 200 of boarding an aircraft cabin having a plurality of unassigned passenger seats is described. In various embodiments, the method 200 is characterized as a hybrid model that shares benefits of both assigned seating and unassigned seating models. In various embodiments, a first step 202 includes setting a plurality of occupancy indicators within the aircraft cabin to indicate an unoccupied status among a plurality of unassigned passenger seats. A second step 204 includes receiving via a processor and over a communication link reservation data from one or more of a plurality of ticketed passengers via a computing device (or a plurality of computing devices) having seating reservation application engines installed thereon. A third step 206 includes activating via the processor various of the plurality of occupancy indicators to indicate an occupied status based on the reservation data received from the one or more of a plurality of ticketed passengers. A fourth step 208 includes boarding the aircraft, with each unreserved passenger selecting a seat indicated via an occupancy indicator as being in an unoccupied or unreserved status or with each reserved passenger selecting the seat indicated via an occupancy indicator as being in an occupied or reserved status in accordance with the reservation data received previously from the reserved passenger. Once an unreserved passenger (e.g., a ticketed passenger without a reservation) selects and occupies a seat indicated as being in an unoccupied status, the occupancy indicator corresponding to the seat is switched to indicate an occupied status for the duration of the flight. In various embodiments, the reservation data received from the one or more reserved passengers (e.g., a ticketed passenger with a reservation) is generated and provided to the aircraft cabin via an application software that may be downloaded, for example, onto a smartphone. The application software allows a passenger to reserve a seat during or prior to the boarding operation of the aircraft using an unassigned seat model. In addition, the application software allows a passenger to reserve a plurality of seats (e.g., for a family or for a party of business associates) during or prior to boarding the aircraft using the unassigned seat model.

Figure 3A:
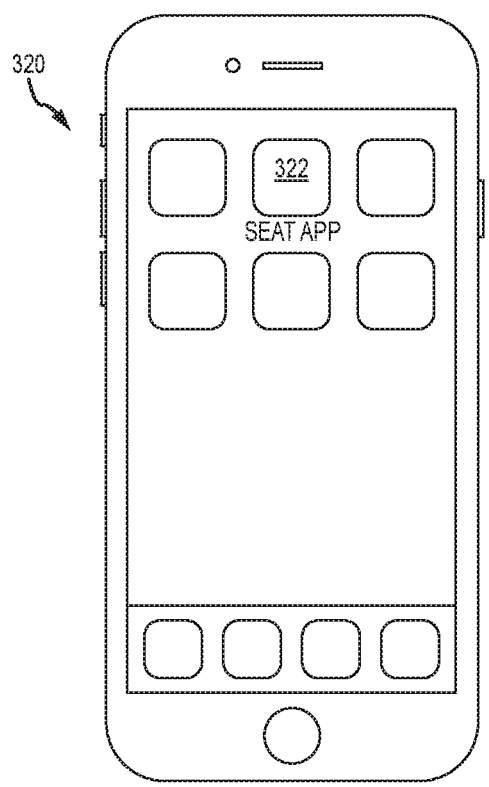
FIGS. 3A and 3B illustrate a smartphone having a seating reservation application engine installed thereon.
Figure 3B:
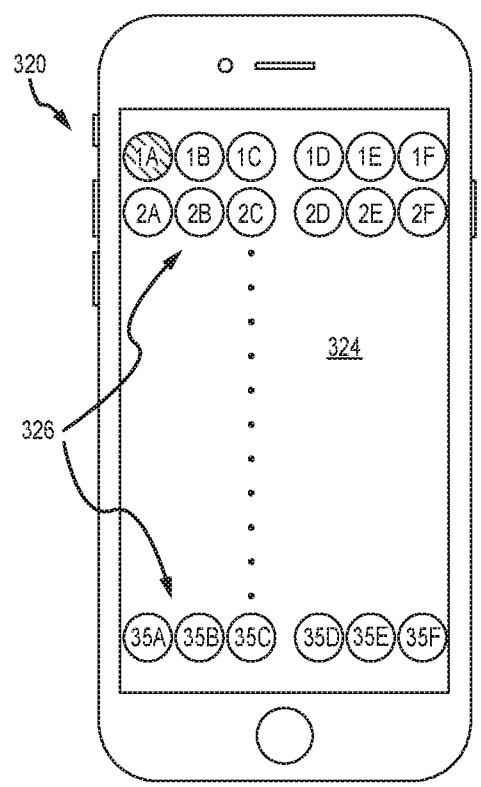

Referring now to FIGS. 3A and 3B, a computing device, such as, for example, a smartphone 320 having a seating reservation application engine 322 installed thereon is illustrated. Typically, the seating reservation application engine 322 will be specific to a single airline and will be configured for reserving a seat on a specific flight operated by the airline. In various embodiments, the method 200 above described with reference to FIG. 2 may be carried out using the seating reservation application engine 322. For example, during or following the purchase of a ticket (or a plurality of tickets), a ticketed passenger may start the seating reservation application engine 322, as illustrated in FIG. 3A, by selecting the "Seat App" or a similar button on the smartphone. Following the start of the seating reservation application engine 322, flight data, such as, for example, a flight number, may be entered to identify the flight of interest. Following entry of the flight data, a screen 324 showing the various seats within the cabin is provided on the smartphone 320. Each of the seats—e.g., seat 1A— is indicated as currently occupied or unoccupied via a color code appearing on a plurality of buttons 326 that represents the plurality of seats throughout the cabin. For example, a seat—e.g., seat 1A— may be indicated as being occupied by a red color on the screen 324 over the button representing seat 1A, while the unoccupied seats may be indicated as unoccupied by a green color or no color at all. During a boarding process, each of the plurality of buttons 326 representing the seats on the screen 324 will progressively be colored red as the seats progressively become occupied by the ticketed passengers boarding the aircraft.

During the boarding operation, or even prior to the boarding operation, a ticketed passenger may use the seating reservation application engine 322 to reserve a seat or a plurality of seats (e.g., in the case of a family or two or more business associates desiring to sit together), generally upon payment of a fee. Once the seat or the plurality of seats is reserved, the button(s) among the plurality of buttons 326 is colored red to indicate the selected seats are now occupied, even though the passenger has yet to board the aircraft. At the same time, the occupancy indicator corresponding to the selected seat(s)—e.g., one or more of the first occupancy indicator 103, the second occupancy indicator 105 and the third occupancy indicator 107 described above with reference to FIG. 1—is activated to indicate the seat corresponding to the occupancy indicator is occupied. Activating the occupancy indicator in this fashion informs the passengers currently boarding that the seat is occupied (or reserved) and that another seat must be selected for the flight.

Figure 4:
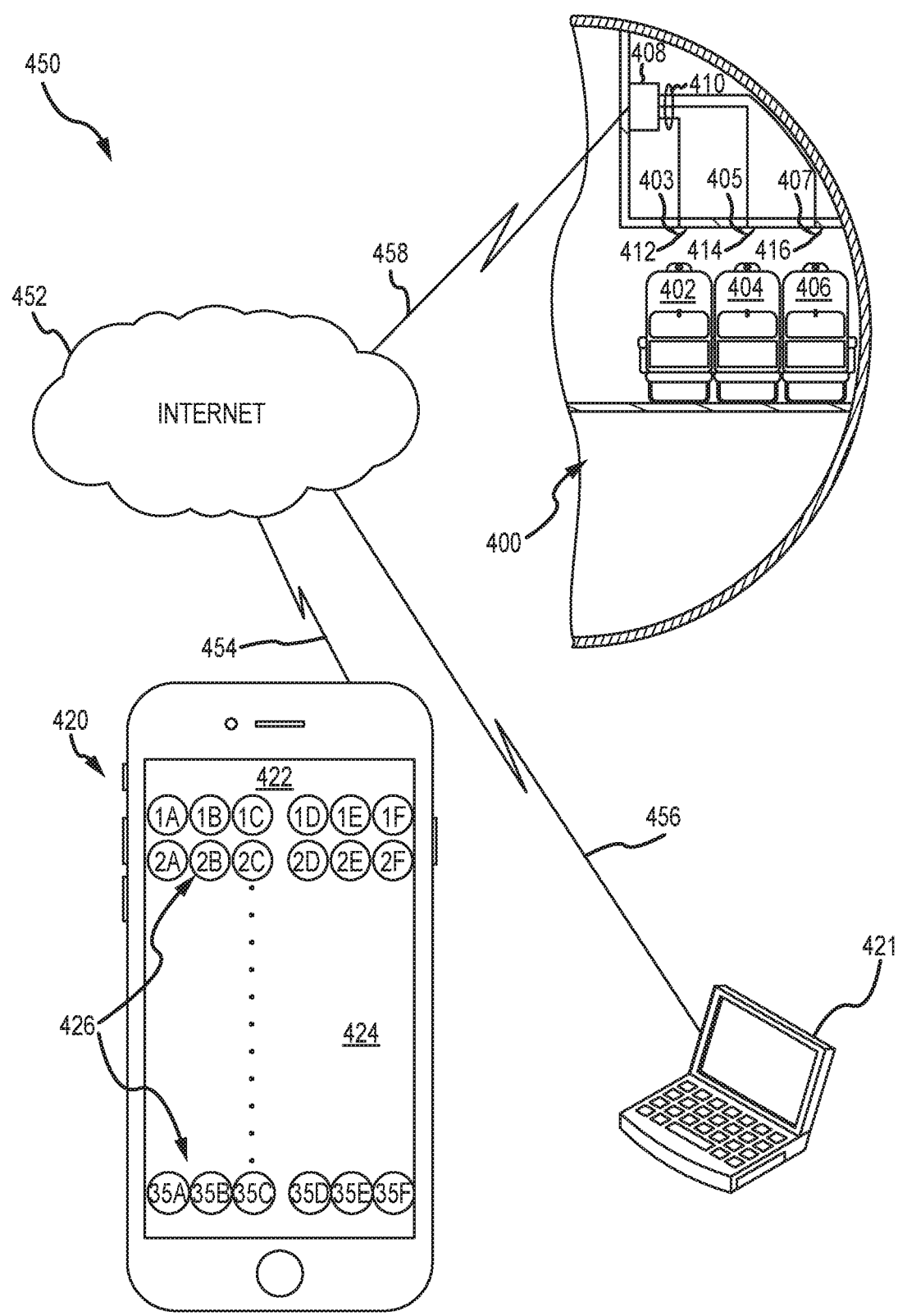
FIG. 4 illustrates a system for carrying out a boarding process for an aircraft using a hybrid seating model.

Referring now to FIG. 4, a system 450 for boarding a plurality of passengers onto a passenger vehicle having a plurality of unassigned seats is illustrated. In various embodiments, the system 450 is configured to carry out the method 200 described above with reference to FIG. 2 using the smartphone 320 and the seating reservation application engine 322 described above with reference to FIGS. 3A and 3B. As described above with reference to FIG. 1, a passenger seating section 400 includes a plurality of seats, such as, for example, a first passenger seat 402, a second passenger seat 404 and a third passenger seat 406. Associated with each of the first passenger seat 402, the second passenger seat 404 and the third passenger seat 406 is an occupancy indicator, such as, respectively, a first occupancy indicator 403, a second occupancy indicator 405 and a third occupancy indicator 407, where each occupancy indicator may be disposed overhead a corresponding seat and be attached to or disposed proximate a corresponding passenger service unit and electrically connected to a processor 408 via a bus network 410. Each occupancy indicator typically includes a light, such as, for example, a first light 412 that corresponds to the first passenger seat 402, a second light 414 that corresponds to the second passenger seat 404 and a third light 416 that corresponds to the third passenger seat 406, where the status of an occupied or a reserved seat may be indicated by a red light while the status of an unoccupied or a non-reserved seat may be indicated by a green light.

A ticketed passenger desiring to reserve a seat or a plurality of seats prior to or during a boarding process using an unassigned seating model may access a communication link, such as, for example, the Internet 452 (or some other communication link, such as, for example, a local area network or a wide area network) via a computing device—e.g., a smartphone 420 running a seating reservation application engine 422 (e.g., the seating reservation application engine 322 described above with reference to FIGS. 3A and 3B), a desktop computer, or a laptop computer 421 running a similar seating reservation application engine. For example, during or following the purchase of a ticket (or a plurality of tickets), a ticketed passenger may start the seating reservation application engine 422 by selecting a "Seat App" button on the smartphone 420 or the laptop computer 421. Following commencement of the seating reservation application engine 422, a screen 424 showing the various seats within the cabin is provided on the smartphone 420 or the laptop computer 421. Each of the seats—e.g., seat 1A—is indicated as currently occupied or unoccupied via a color code appearing on a plurality of buttons 426 that represents the plurality of seats throughout the cabin. For example, a seat—e.g., seat 1A—may be indicated as being occupied by a red color on the screen 424 over the button representing seat 1A, while the unoccupied seats may be indicated as unoccupied by a green color or no color at all.

As described above, during or prior to the boarding operation, a ticketed passenger may use the seating reservation application engine 422 to reserve a seat or a plurality of seats, generally upon payment of a fee. Reservation data concerning a reserved seat may be sent to the Internet 452 via a communications link, such as, for example, a smartphone link 454 from the smartphone 420 or via a laptop link 456 from the laptop computer 421. Once the seat or the plurality of seats is reserved, the button(s) among the plurality of buttons 426 is colored red to indicate the selected seats are now occupied, even though the passenger has yet to board the aircraft. At the same time, the reservation data is sent to the processor 408 via a cabin link 458 that instructs the processor 408 to change the occupancy indicator corresponding to the selected seat(s)—e.g., one or more of the first occupancy indicator 403, the second occupancy indicator 405 and the third occupancy indicator 407—to indicate the seat corresponding to the occupancy indicator is occupied. Activating the occupancy indicator in this fashion informs the passengers currently boarding the aircraft that the seat is occupied (or reserved) and that another seat must be selected for the flight. For example, the first passenger seat 402 may be indicated as occupied by activating the first occupancy indicator 403 or by changing the first light 412 from a first color to a second color (e.g., from a green color to a red color) indicating the seat is occupied.

The above disclosure describes methods, systems and apparatus configured to shorten the time required to board a passenger vehicle, particularly where the boarding process is performed using an unassigned seating model. An occupancy indicator associated with each seat of a plurality of passenger seats is configured to indicate whether the seat is occupied or otherwise reserved by activating a light to exhibit a first color, indicating the seat is occupied or reserved, or a second color, indicating the seat in unoccupied or unreserved. In various embodiments, other indicators may be employed, such as, for example, illuminating the seat with a mark (e.g., an X to indicate an occupied or a reserved status) or a passenger name. As described above, the methods, systems and apparatus disclosed herein enables a family or a party of business associates to be seated together or passengers requiring particular needs or desires (e.g., access to an aisle seat or a window seat) to be satisfied. A fee may be charged by an owner or operator of the passenger vehicle for the reservation of one or more of a plurality of unassigned seats. Once seated in an unoccupied or unreserved seat, a passenger may cause the occupancy indicator to indicate an occupied or reserved status by manually activating a switch or the like, thereby allowing the passenger to leave the seat during the boarding process without concern of losing the seat to another passenger.

In various embodiments, components, modules, or engines of the systems or apparatus described herein may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® operating system, and the like. The micro-app may be configured to leverage the resources of a larger operating system and associated hardware via a set of predetermined rules that govern the operation of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system that monitors various hardware components and then communicates a detected input from the hardware to the micro-app.

The system and methods described herein may also be described in terms of functional block components, screen shots, optional selections, and various processing steps. It should be appreciated that such functional blocks may be realized by any number of hardware or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT®, JAVASCRIPT® Object Notation (JSON), VBScript, Macromedia COLD FUSION, COBOL, MICROSOFT® Active Server Pages, assembly, PERL®, PHP, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like.

The various system components discussed herein may also include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; or like data useful in the operation of the system. As those skilled in the art will appreciate, users computer may include an operating system (e.g., WINDOWS®, UNIX®, LINUX®, SOLARIS®, MACOS®, etc.) as well as various conventional support software and drivers typically associated with computers.

As used herein, the term "network" includes any cloud, cloud computing system, or electronic communications system or method that incorporates hardware or software components. Communication among the components of the systems may be accomplished through any suitable communication channels, such as, for example, a telephone network, an extranet, an intranet, or an internet. Such communications may also occur using online communications, satellite communications, off-line communications, wireless communications, transponder communications, local area network (LAN), wide area network (WAN), or virtual private network (VPN). Moreover, the systems may be implemented with TCP/IP communications protocols, IPX, APPLETALK®, IP-6, NetBIOS, OSI, any tunneling protocol (e.g., IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by *In Re Nuijten* to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A system for boarding a plurality of passengers onto a passenger vehicle having a plurality of seats, comprising:
   a first passenger seat and a first occupancy indicator, the first occupancy indicator associated with the first passenger seat;
   a second passenger seat and a second occupancy indicator, the second occupancy indicator associated with the second passenger seat; and
   a processor connected to a communication link and to the first occupancy indicator and to the second occupancy indicator,
   wherein the processor is configured to receive reservation data directly from a passenger computing device having a seating reservation application engine installed thereon and to transmit an indication of seat occupancy of each of the plurality of seats to the passenger computing device for display by the reservation application engine, the passenger being one of the plurality of passengers, the passenger computing device configured for connection to the communication link and the seating reservation application engine configured to activate the first occupancy indicator or the second occupancy indicator via the processor.

2. The system of claim 1, wherein the communication link comprises a local area network.

3. The system of claim 1, wherein the communication link comprises a wide area network or an internet.

4. The system of claim 1, wherein at least one of the first occupancy indicator and the second occupancy indicator is stored within a passenger service unit.

5. The system of claim 4, wherein at least one of the first occupancy indicator and the second occupancy indicator is a reading light.

6. The system of claim 1, wherein the passenger computing device is a smartphone.

7. The system of claim 1, wherein the first occupancy indicator is configured to illuminate a first color when the first passenger seat is not occupied or not reserved.

8. The system of claim 7, wherein the first occupancy indicator is configured to illuminate a second color when the first passenger seat is occupied or reserved.

9. The system of claim 8, wherein the first color is green and the second color is red.

10. The system of claim 1, wherein the passenger vehicle is an aircraft and the processor is configured to receive the reservation data from the computing device during a boarding process.

11. The system of claim 10, wherein the seating reservation application engine is configured to activate both the first occupancy indicator and the second occupancy indicator based on instructions received from one of the plurality of passengers.

12. A method of boarding an aircraft cabin having a plurality of passenger seats, comprising:
   setting a plurality of occupancy indicators within the aircraft cabin to indicate an unoccupied status among a plurality of unassigned passenger seats of the plurality of passenger seats;
   transmitting, via a processor, an occupancy status of each of the plurality of passenger seats to a passenger computing device having a seating reservation application engine installed thereon;
   receiving, via the processor, reservation data directly from the passenger computing device indicating a first seat of the plurality of passenger seats to occupy;

activating via the processor one or more of the plurality of occupancy indicators to indicate a reserved status based on reservation data received from one or more of a plurality of ticketed passengers via a communication link; and updating, by the processor, the occupancy status of one of the passenger seats to an occupied status for display on the passenger computing device.

13. The method of claim 12, wherein the reservation data is received over the communication link from the passenger computing device.

14. The method of claim 13, wherein the passenger computing device is configured for connection to the communication link.

15. The method of claim 14, wherein the seating reservation application engine is configured to activate a first occupancy indicator associated with a first passenger seat or a second occupancy indicator associated with a second passenger seat.

16. The method of claim 15, wherein the communication link comprises a local area network, a wide area network or an internet.

17. The method of claim 16, wherein at least one of the first occupancy indicator and the second occupancy indicator is a light stored within a passenger service unit.

18. The method of claim 17, wherein the first occupancy indicator is configured to illuminate a first color when the first passenger seat is not occupied or not reserved.

19. The method of claim 18, wherein the first occupancy indicator is configured to illuminate a second color when the first passenger seat is occupied or reserved.

20. The method of claim 19, wherein the seating reservation application engine is configured to activate both the first occupancy indicator and the second occupancy indicator based on instructions received from one of the plurality of ticketed passengers.

\* \* \* \* \*